(12) United States Patent
Walton et al.

(10) Patent No.: US 7,003,155 B2
(45) Date of Patent: Feb. 21, 2006

(54) SYSTEM AND METHOD FOR CREATING UNCLASSIFIED LINE DRAWINGS FROM CLASSIFIED NTM IMAGES

(75) Inventors: William C. Walton, Severn, MD (US); Cash J. Costello, Columbia, MD (US); Elissa M. Weidaw, Reston, VA (US)

(73) Assignee: The John Hopkins University, Baltimore, MD (US)

( * ) Notice: Subject to any disclaimer, the term of this patent is extended or adjusted under 35 U.S.C. 154(b) by 723 days.

(21) Appl. No.: 10/255,823

(22) Filed: Sep. 26, 2002

(65) Prior Publication Data

US 2003/0059113 A1    Mar. 27, 2003

Related U.S. Application Data

(60) Provisional application No. 60/325,396, filed on Sep. 27, 2001.

(51) Int. Cl.
G06K 9/34    (2006.01)

(52) U.S. Cl. ............... 382/180; 382/242; 382/299; 382/300; 701/200

(58) Field of Classification Search ........ 382/180, 382/242, 260, 274, 298, 299, 300; 707/100, 707/103; 701/200, 223
See application file for complete search history.

(56) References Cited

U.S. PATENT DOCUMENTS

2003/0113028 A1 * 6/2003 Katata et al. ............... 382/240
2004/0007121 A1 * 1/2004 Graves et al. ............... 89/1.11

* cited by examiner

*Primary Examiner*—Sanjiv Shah
*Assistant Examiner*—Ali Bayat
(74) *Attorney, Agent, or Firm*—Albert J. Fasulo, II

(57) ABSTRACT

A system and method of automatically creating a NIMA certified line drawing from a National Imagery Transmission Format (NITF) image file. A grayscale (electro-optical) image and its associated metadata from a NITF file is input into the computer based system. Pre-screening operations are performed on the metadata prior to image processing to ensure that National Imagery and Mapping Agency (NIMA) requirements and criteria are met. Image processing algorithms then perform filtering, encoding, edge detection, and custom edge pattern classification procedures to create a declassified line drawing. The line drawing can then be saved in any number of standard commercial file formats.

12 Claims, 4 Drawing Sheets

SYSTEM AND METHOD FOR CREATING UNCLASSIFIED LINE DRAWINGS FROM CLASSIFIED NTM IMAGES

CROSS REFERENCE TO RELATED APPLICATIONS

This application is related to and claims the benefit of U.S. Provisional Patent Application Ser. No. 60/325,396, filed Sep. 27, 2001 entitled "Tactical Image Rendering Tool Image Processing Algorithm for Creation of Unclassified Line Drawings from Classified National Technical Means Imagery".

STATEMENT OF GOVERNMENTAL INTEREST

This invention was made with Government support under a Navy contract no. 98-C-6663.

FIELD OF THE INVENTION

The present invention is related to a system and method of security downgraded image derived product (IDP) creation. More specifically, the present invention processes classified National Technical Means (NTM) imagery, in an automated manner, to create line drawings that are eligible to be labeled as unclassified.

The National Imagery and Mapping Agency (NIMA) maintains National Technical Means (NTM) imagery for use by various United States Department of Defense Agencies and Commands. The security classification of the images, and sometimes the inherently large file sizes, prohibit the images from being used in certain operations. One common means for addressing the security classification issue is to create image derived products that are eligible for security classification downgrade. One type of IDP is a line drawing, a simple, street map-like rendering. NIMA maintains the criteria that govern the creation of line drawings. Moreover, NIMA approval is required for any new technique for creating line drawings.

Traditionally, line drawings were created manually using CAD-like procedures in which analysts traced lines and polygons (in an overlay) over regions or objects of interest in an NTM image. Line drawings can also be made by manually tracing lines on stencil paper over images. These annotations can then be saved or printed separately to serve as the line drawing. The process can be tedious and can take hours to complete.

What is needed is a NIMA certified automated means for creating image derived product line drawings from NTM image data.

SUMMARY

The present invention comprises a computer based automated means of creating unclassified line drawings from National Technical Means (NTM) image data. With the present invention, an operator can create a line drawing in just a few seconds. Most importantly, the present invention is the first automatic tool for producing line drawings that has been certified by the National Imagery and Mapping Agency (NIMA).

The present invention has been certified by NIMA for processing Electro-Optical image types and takes as input a grayscale image and associated metadata from a National Image Transmission Format (NITF) file. Prior to processing, however, pre-screening steps are required to ensure that rigid security constraints are met. Once the pre-screening has been successfully completed, the image processing algorithm(s) that create the line drawings perform filtering and encoding operations. The line drawing can then be saved in a variety of commercial file formats (i.e., tif, png, jpg, nitf).

DETAILED DESCRIPTION

A line drawing is a street map like image that reveals boundaries of buildings, roads, rivers, regions, and other items of interest in an image scene. A line drawing is one form of a NIMA NTM image derived product (IDP). There are numerous potential public uses for unclassified NIMA line drawings including unclassified maps, terrain revealing diagrams, GIS style drawings, drawings for forest-fire management, drawings of urban environments, drawings for farmland and forest regions. The present invention also has the ability to semi-automatically identify and emphasize regions of interest for display in the line drawings.

Figure 1:
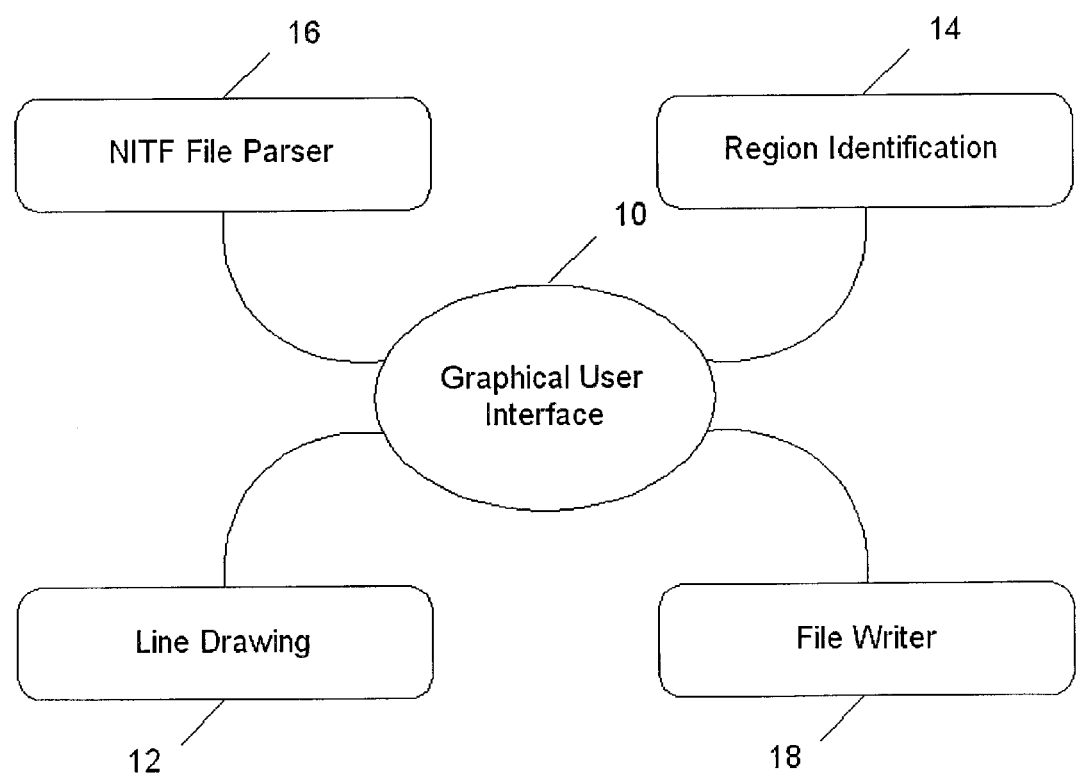
FIG. 1 illustrates the major processes involved in converting a classified NTM image into an unclassified line drawing.

FIG. 1 illustrates the major processes involved in creating a security downgraded unclassified line drawing from a classified NTM image. A computer based graphical user interface (GUI) 10 serves as the link between the user and the data allowing the user to initiate and perform the various tasks involved in creating an unclassified line drawing from NTM image data. The GUI 10 is typically a windows based menu driven graphical display controlled by a computer processor. The present invention utilizes standard computer input and output devices including, but not limited to, a mouse, a joystick, a keyboard, printer(s), and a screen display. Input data may be read from internal memory, a computer storage medium such as a floppy disk or CD-ROM. Data may also be received over a network connection such as a Local Area Network (LAN), a private network, or even the Internet. The line drawings that comprise the final output may be saved to internal memory, to a storage medium, or sent over a network to a remote destination.

The key image processing components are the line drawing generation process 12 and the region identification process 14. Prior to performing line drawing and/or region identification, however, an NITF file parser process 16 pre-screens the NTM image data for security reasons. The line drawing process 12 then creates lines and the region identification process 14 facilitates specification of regions of interest that can be highlighted in the line drawings. The line drawings can subsequently be saved in multiple file formats using a file writer process 18 including, but not limited to, tif, png, jpg, and nitf.

Figure 2:
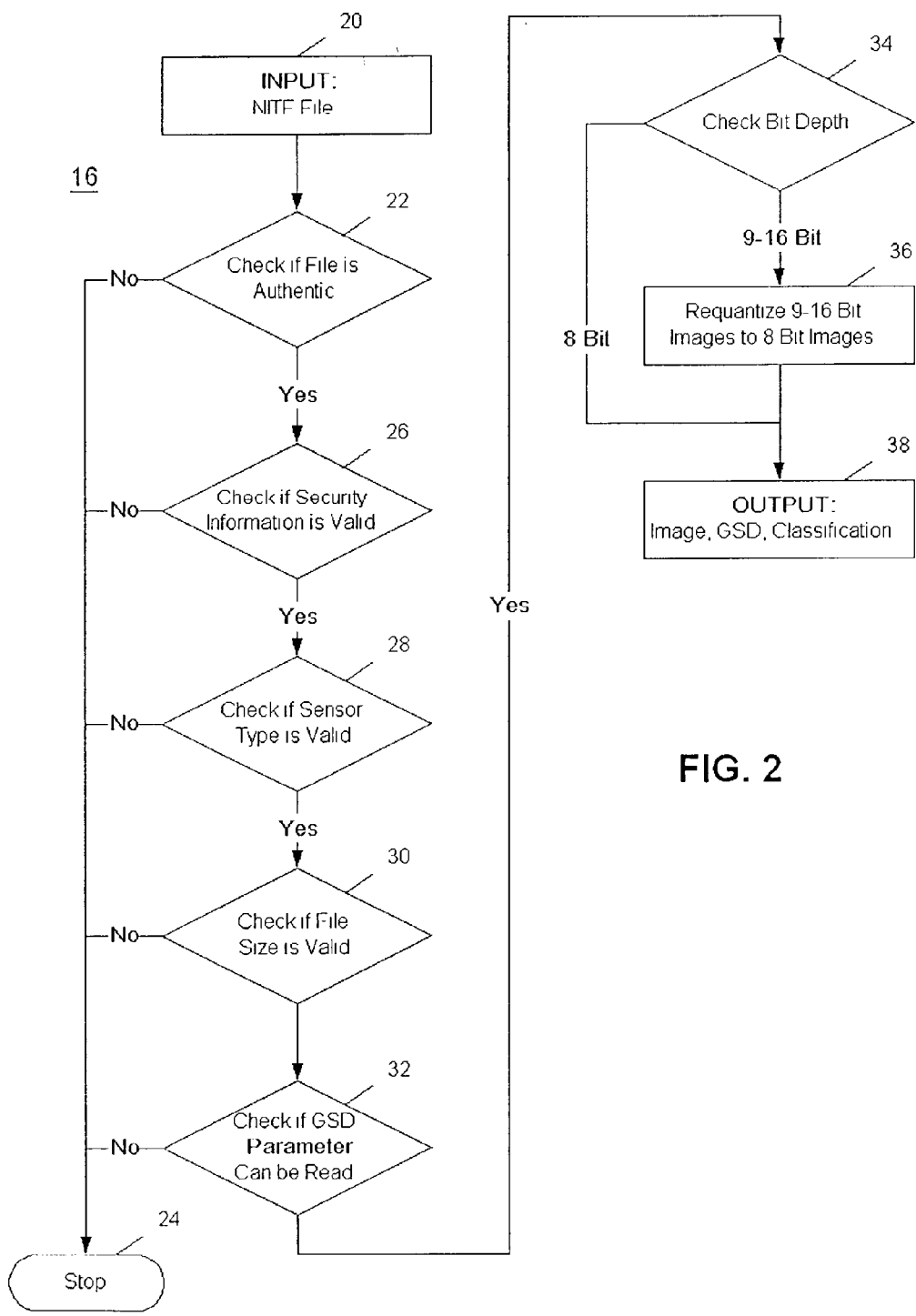
FIG. 2 is a flowchart describing the NITF file parsing pre-screening process.

FIG. 2 is a flowchart describing the NITF file parsing pre-screening process. The NITF file parsing pre-screening process 16 is responsible for performing a host of security checks on the header of an NITF file to ensure that NIMA security requirements are met. The file parsing process begins with the NITF file as input 20. The NITF file header is first checked for authenticity 22. Authenticity involves performing checks on file metadata to determine if the image or certain critical metadata has been tampered with. If the file is not authentic, then processing is stopped 24 and the file will not be prepared for and input to the line drawing process. If the NITF file is authentic, then it is next checked to see if the security information within the file header is valid 26. The present invention has been certified to process images of a certain security classification level. If the metadata indicates that the NTM image data does not correspond to the specified security level, then the present invention will not allow the image to be processed into a line drawing. If the security information is not valid, then processing is again stopped 24. If the security information is valid, then the sensor type is checked for validity 28. The present invention is approved to process only electro-optical type imagery. If the sensor type is invalid processing is stopped 24. Otherwise, the next check is to see if the file size is valid 30. This check is not related to security issues but rather to verify that the computer platform that the present invention is running on is sufficient to handle the file size to be used as input to the line drawing process. If the file size is too large, processing is stopped 24. If the file size is valid, then the a check is made to see if the ground sample distance (GSD) parameter can be read 32.

The GSD parameter is a spatial resolution measurement that determines the clarity of the image data. It essentially represents the size of a pixel with respect to the ground. For instance, if each side of a 10×10 square foot building is represented by 5 pixels in the image data, then the GSD parameter would be (10 ft*12 inches/ft)/5=24 inches. If the side of a 10×10 square foot building is represented by 8 pixels in the image data, then the GSD parameter would be (10 ft*12 inches/ft)/8=15 inches. Thus, a smaller GSD implies more detailed image data and a better quality image.

If the GSD parameter cannot be read, processing is stopped 24. If the GSD parameter can be read then the bit depth of the file is determined 34. The bit depth of the input image can range from 8 to 16 bits. If the bit depth is larger than 8 bits, then the images are requantized to 8 bits 36. Utilizing an 8 bit depth aids in allocating and using computer memory and also expedites certain algorithmic processing steps. Once the images have been set to 8 bit depth the file parsing process produces an output 38 comprising an image, a GSD parameter, and a security classification.

The pre-screening process is performed to meet NIMA security requirements and criteria. To date, the present invention is the only NIMA certified computer based tool for automatically creating image derived product line drawings from NTM image data.

Figure 3:
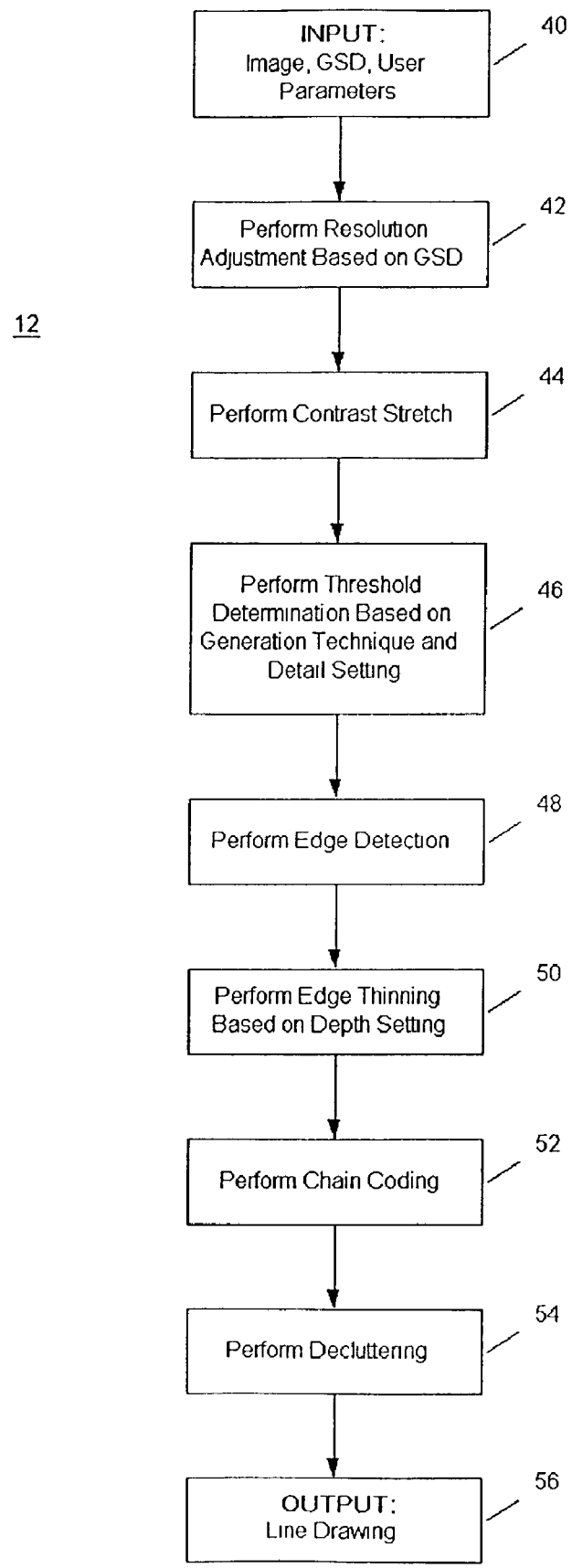
FIG. 3 is a flowchart describing the line drawing process.

FIG. 3 is a flowchart describing the line drawing process. The input 40 to the line drawing process includes the image data and GSD parameter output from the NITF file parsing process as well as user specified parameters that control how the line drawing appears in the final output. The user specified parameters include a technique setting, an appearance setting, and a detail level setting.

The technique setting allows the user to select, via one of the windows under the GUI, one of three techniques for generating the line drawings. The techniques are comprised of a standard technique, a context sensitive technique, and a noise filtered technique.

The standard technique produces a line drawing for which no extra processing has been applied for emphasizing the local features of objects (e.g., windows in a building). The context sensitive technique applies custom processing which attempts to detect and emphasize local object features. This process works by generating edges based on local edge-gradient statistics collected from a square mask that scans the image along with the edge detection operator. The noise filtered technique applies custom processing that tends to generate less noise ( i.e., line fragments) in a scene as well as attempts to emphasize local object features. This process works by first, applying a low pass filter to the image and then generating edges based on local edge-gradient statistics. The statistics are collected from a circular mask (as opposed to a square mask) that scans the image along with the edge detection operators.

The appearance setting includes a more depth option or a less depth option. The more depth option invokes a custom edge thinning algorithm that tends to reveal two or more lines around certain object boundaries. This results in relatively strong edges that have a large gradient magnitude. Also, more local features of objects in the image tend to be revealed. The multiple edges, and additional local detail help the viewer's depth perception for vertical structure objects such as buildings. The less depth option invokes an edge thinning algorithm published by "Nevatia and Babu, Computer Graphics and Image Processing, vol 13, 1980". This algorithm results in only a single edge for object boundaries leading to more of a profile view of buildings and other objects.

The detail level setting is the main setting that the user uses to control the algorithm. This setting directly relates to the threshold that is used to create a binary edge image (i.e., edges on a solid color background). A higher detail level corresponds to a lower threshold, causing more edges (and subsequently, lines) to appear. A lower detail setting does the opposite.

The first step in the line drawing process 12 is a resolution adjustment 42 routine performed on the input image based on the GSD parameter. To perform resolution adjustment, an anti-aliasing filter is applied to the image file to blur the image. A bilinear sub-sampling subroutine then reduces the spatial resolution of the image to approximately 1.2 times the NIMA requirement for minimum resolvable distances. The sub-sampling factor is calculated by dividing the original GSD (in inches) by the 1.2 times NIMA requirement value. Next, a bicubic super-sampling subroutine is applied to bring the image back to its original dimensions. This removes visual blockiness from the image.

The next routine in the line drawing process is a contrast stretch 44 on the resolution adjusted image. The contrast stretching routine 44 performs a linear contrast stretching of pixel intensities to the extreme ranges. The purpose of contrast stretching is to improve the contrast of the image so that edges can better be captured in the following steps. A threshold determination 46 based on the user parameters, generation type and detail setting is the next routine. There are three threshold determination methods that can be applied based on the user parameters. These methods correspond directly to the generation techniques that the user selects via the GUI. One method is a constant global threshold technique that corresponds to the standard technique setting. Another method is a local statistical based threshold technique that corresponds to the context sensitive technique setting. And, the third method is a local statistical based threshold with additional noise filtering techniques that corresponds to the noise filtered technique setting.

An edge detection routine 48 follows the threshold determination routine 46. The edge detection routine 48 used by the present invention is the absolute value version of the Sobel edge detection technique. The Sobel algorithm produces an edge gradient image 48. This is followed by an edge thinning routine 50 on the gradient image based on the appearance parameter that the user inputs or selects via the GUI. There are two edge thinning methods to choose between based on the depth setting. The edge thinning methods were described earlier.

The next routine in the line drawing process 12 is a chain coding routine 52. An 8-directional chain coding technique is applied to the thinned, binary edge image to vectorize the edges. Single pixels are discarded and chain-coded lines are filtered based on length. Only lines with at least a set number of pixels are retained. The final routine in the line drawing process 12 is a decluttering routine 54. It is a custom chain code based edge image decluttering algorithm designed to remove small isolated edges, edges that encircle a single pixel, and edges that contain just a links which form a compact feature. The output of the line drawing process 12 is a line drawing 56 that can be saved by the file writer process 18 in a variety of file formats.

Figure 4:
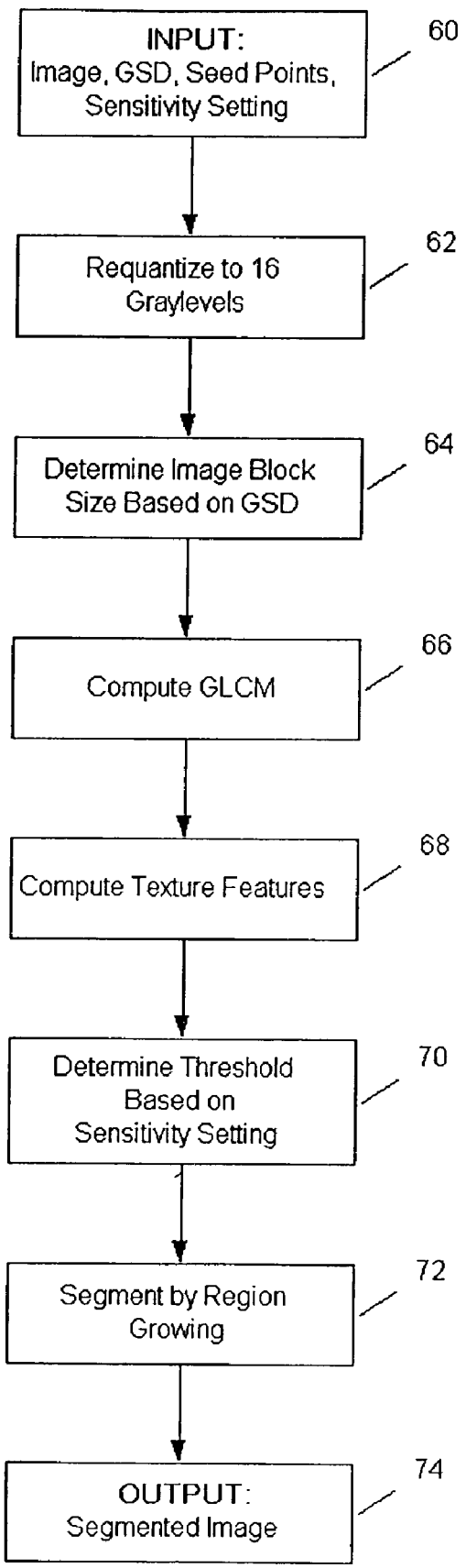
FIG. 4 is a flowchart describing the region identification process.

FIG. 4 is a flowchart describing the region identification process. The region identification process allows certain user specified areas of a line drawing to be highlighted in the final output. These areas can be any of interest to the user and will stand out on the line drawing images.

The input 60 for the region identification process 14 is comprised of the raw image, the GSD, and seed points, and a sensitivity setting. Seed points refer to x,y coordinates in the image that the user selected manually via an input device to the computer. The collection of seed points form a region of interest. The user adjustable sensitivity setting governs the precision with which the algorithm attempts to detect the region defined by the seed points. A low sensitivity setting may result in only partially highlighting a region, or no detection of the region at all. A high sensitivity setting may result in too large of a region being highlighted.

The image is then requantized 62 to 16 graylevels using an equal probability quantization technique. Next, the image block size is determined 64 based on the GSD. The block size is at least 8×8 pixels with smaller GSD values having a larger block size. This is followed by a computation of the global level co-occurrence matrix (GLCM) 66 that captures the spatial statistical dependency of pixels in each block. Texture features are computed 68 depending on the region selected. This is followed by determining the threshold based on the sensitivity setting 70. The threshold is applied to determine image blocks that are classified as the specified region. The last routine in the region identification process is to segment the image by region growing 72. The segmenting is done in the statistical feature space instead of the pixel intensity space. The output 74 of the region identification process 14 is a segmented image.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A NIMA certified method of automatically creating a line drawing from a National Imagery Transmission Format (NITF) image file comprising:
   pre-screening the NITF image file to verify that the file meets NIMA criteria, wherein said pre-screening results in an image and a ground sample distance (GSD) parameter for input into a line drawing process; and
   performing a line drawing process on the image comprising:
      adjusting the resolution of the image to meet NIMA criteria;
      performing edge detection on the adjusted image;
      chain coding the image to meet NIMA criteria;
      decluttering the chain coded image to meet NIMA criteria resulting in a NIMA certified line drawing.

2. The method of claim 1 further comprising performing a region identification process comprising:
   selecting seed points in the pre-screened image that delineate a region of interest;
   selecting a sensitivity setting that determines the degree of precision that the region will be detected;
   requantizing the image to 16 graylevels using an equal probability quantization technique;
   determining the image block size based on the GSD parameter;
   computing the global level co-occurrence matrix (GLCM) to capture the spatial statistical dependency of pixels in each block;
   computing texture features;
   determining a threshold based on the sensitivity setting; and
   segmenting the image by region growing to produce a visually identifiable region in the line drawing.

3. The method of claim 1 wherein the resulting line drawing is saved in tif file format.

4. The method of claim 1 wherein the resulting line drawing is saved in png file format.

5. The method of claim 1 wherein the resulting line drawing is saved in jpg file format.

6. The method of claim 1 wherein the resulting line drawing is saved in nitf file format.

7. The method of claim 1 wherein the resulting line drawing is saved in nitf file format.

8. A NIMA certified system for automatically creating a line drawing from a National Imagery Transmission Format (NITF) image file comprising:
   means for pre-screening the NITF image file to verify that the file meets NIMA criteria, wherein said pre-screening results in an image and a ground sample distance (GSD) parameter for input into a line drawing process; and
   means for performing a line drawing process on the image comprising:
      means for adjusting the resolution of the image to meet NIMA criteria;
      means for performing edge detection on the adjusted image;
      means for chain coding the image to meet NIMA criteria;
      means for decluttering the chain coded image to meet NIMA criteria resulting in a NIMA certified line drawing.

9. The system of claim 8 further comprising performing a region identification process comprising:
   means for selecting seed points in the pre-screened image that delineate a region of interest;
   means for selecting a sensitivity setting that determines the degree of precision that the region will be detected;
   means for requantizing the image to 16 graylevels using an equal probability quantization technique;
   means for determining the image block size based on the GSD parameter;

means for computing the global level co-occurrence matrix (GLCM) to capture the spatial statistical dependency of pixels in each block;
means for computing texture features;
means for determining a threshold based on the sensitivity setting; and
means for segmenting the image by region growing to produce a visually identifiable region in the line drawing.

10. The system of claim 8 further comprising means for saving the line drawing in tif file format.

11. The system of claim 8 further comprising means for saving the line drawing in jpg file format.

12. The system of claim 8 further comprising means for saving the line drawing in png file format.

* * * * *